United States Patent [19]
Krieckaert et al.

[11] Patent Number: 5,628,294
[45] Date of Patent: May 13, 1997

[54] SYSTEM AND METHOD FOR METERING THE FUEL SUPPLY TO A COMBUSTION INSTALLATION OPERATING ON MORE THAN ONE TYPE OF FUEL

[75] Inventors: Paul E. C. Krieckaert, Heeze; Johannes G. W. M. Oerlemans, Son; Petronella C. De Laat-De Haas, Schijndel, all of Netherlands

[73] Assignee: Gentec b.v., Son, Netherlands

[21] Appl. No.: 617,926

[22] PCT Filed: Sep. 21, 1994

[86] PCT No.: PCT/NL94/00229

§ 371 Date: Apr. 12, 1996

§ 102(e) Date: Apr. 12, 1996

[87] PCT Pub. No.: WO95/08706

PCT Pub. Date: Mar. 30, 1995

[30] Foreign Application Priority Data

Sep. 21, 1993 [NL] Netherlands ............... 9301635

[51] Int. Cl.[6] .............. F02M 21/02; F02D 19/06; F02C 9/40; F23N 5/00
[52] U.S. Cl. .............................. 123/525; 123/575
[58] Field of Search ................ 123/27 GE, 525, 123/526, 575

[56] References Cited

U.S. PATENT DOCUMENTS 5,228,423  7/1993  Oikawa et al. .................. 123/525
5,531,200  7/1996  Hosoe et al. ..................... 123/425

FOREIGN PATENT DOCUMENTS

| 0494467 | 7/1992 | European Pat. Off. . |
| 0557539 | 9/1993 | European Pat. Off. . |
| 61-210236 | 9/1986 | Japan ............................ 123/525 |
| 8303120 | 9/1983 | WIPO ........................... 123/525 |
| WO92/08888 | 5/1992 | WIPO . |

*Primary Examiner*—Erick R. Solis
*Attorney, Agent, or Firm*—Young & Thompson

[57] ABSTRACT

In order to supply a combustion installation, such as an internal combustion engine, with a second type of fuel, in particular LPG, in addition to a first type of fuel, such as petrol, a second control unit is coupled to a first or original electronic control unit of the engine. In response to first control signal values emitted by the first control unit, said second control unit, during operation on LPG, emits second control signal values for metering the LPG supply. With this arrangement the first control signal values received from the first control unit are compared with the values recorded by the second control unit during operation on petrol. The second control signal values emitted by the second control unit are now so adjusted that, during operation on LPG, the first control signal values are still kept within a predetermined range (operating range) of the first control signal values recorded during operation on petrol.

19 Claims, 1 Drawing Sheet

SYSTEM AND METHOD FOR METERING THE FUEL SUPPLY TO A COMBUSTION INSTALLATION OPERATING ON MORE THAN ONE TYPE OF FUEL

The invention relates to a system and method for the metered supply of at least a first and a second type of fuel, in particular petrol and LPG (Liquid Petroleum Gas), to a combustion installation, such as an internal combustion engine.

Combustion installations, which operate on more than one type of fuel, such as internal combustion engines, whereby the fuel supply is controlled by means of an electrical/electronic control unit are known per se in practice. The differences in energy content of the fuels concerned, which necessitate adapted metering, constitute a problem to be solved with such installations.

Netherlands Patent Application 82.00993 describes a system for the metered supply of petrol and/or LPG to an internal combustion engine with the aid of time-controlled fuel injectors. A mutually correct mechanical calibration of the petrol and LPG injectors used enables both types of injectors to be controlled by the same electronic control unit, which controls the duration and frequency of opening of the injectors, over the entire power and speed range of the engine.

International Patent Application WO-A-9,208,888 likewise describes a system for electronically controlled metering of the supply of petrol and LPG to an internal combustion engine, with which system the differences in energy content of the different types of fuel are compensated for with the aid of an additional electronic unit instead of by mechanical calibration of the injectors concerned. With this system the original electronic control unit for the petrol injectors is then used to determine the frequency of opening of the LPG injectors, whilst the additional electronic unit converts the duration of opening of the petrol injectors into a corresponding value for LPG. This system can essentially be regarded as the electronic equivalent of the mechanically calibrated fuel supply system disclosed in the said Netherlands Patent Application 82.00993.

Both systems have a facility for adapting the duration of opening of the injectors to a changing composition of the fuel, in which context consideration can be given to, for example, winter and summer composition of LPG, as a consequence of which the calorific value and the required amount of air per unit volume of fuel injected are not constant.

It has been found that this method of metering of the types of fuel is not optimum, which can be appreciated as follows.

Present day control units used for internal combustion engines have adaptive control characteristics. That is to say, the control unit is configured in such a way that it adjusts automatically to a change in the demand for fuel owing to, for example, wear, play or other causes in the engine, so as to be able to deliver performances comparable to those obtained when the engine is without defect. If an engine is run for a prolonged period on a first type of fuel, for example petrol, the control strategy of the control unit will have been optimally adjusted for petrol metering.

In particular because of the differences in calorific value of the types of fuel used, it will be clear that when there is a changeover from petrol to, for example, LPG the control unit will, as a consequence of its adaptive mode of operation, in the course of time adjust its control strategy to the optimum for LPG. In order to compensate for the metering variations which occur in the engine as a consequence of wear, play and the like, these two control strategies will, in general, not be the same.

On switching back from LPG to petrol a situation can then also arise in which, as a consequence of the use of LPG, the control unit has been adjusted into a region completely outside the operating range for petrol. Consequently, before optimum metering for petrol is achieved again, the internal combustion engine is not adequately controlled, which gives rise to temporarily reduced performance, but also to incorrect combustion with emissions causing additional environmental pollution and, possibly, a higher fuel consumption as the major adverse characteristics. Damage to system components, such as, for example, a catalytic converter, can also occur.

Another problem can arise because the adjustment which the control unit has to make on switching fuels is such that it is interpreted as being caused by a fault in the system. The control unit will then start to operate on its preset (default) values, which, of course, are not adjusted to the current condition of the engine (wear, play and the like) or fuel characteristics (calorific value, etc.). This likewise leads to a reduction in performance or efficiency, a possibly higher fuel consumption and increased environmental pollution.

European Patent Application EP-A-0557539 discloses an alternative fuel system that can be used in conjunction with the existing primary fuel system in a combustion installation. The known system uses the output signals of the first control unit associated with the primary system and adapts these signals by means of a second control unit which controls the fuel supply of the alternative fuel system. In case said first electronic control unit has adaptive control characteristics, this known system obviously has the disadvantage mentioned above; namely that in time, when switching regularly from the first fuel to the second, alternative fuel, the control strategy developed by the first control unit will be adjusted into a region completely outside the operating range of for the first fuel.

The objective on which the invention is based is, therefore, firstly to indicate a system and method for a combustion installation, operating on an original or first type of fuel, for the metered supply of an alternative or second type of fuel in such a way that the original or first electronic control unit used for metering the first fuel can be used to control the metering of the alternative or second fuel, without, however, the control strategy developed by said first control unit being adjusted outside the operating range for the first fuel.

According to the invention, to this end a system is provided which comprises a first electronic control unit for metering, via fuel supply means, the supply of the first and second fuel, and detection means for the detection of process and operating parameter values of the combustion installation, a second electronic control unit, coupled to the first control unit and the fuel supply means, for metering the supply of the second fuel under the control of the first control unit, characterized in that said first electronic control unit has adaptive control characteristics and said second control unit comprises recording means for, during operation on the first fuel, recording, as a function of respective detected process and operating parameter values, first control signal values emitted by the first control unit and control and comparison means for, during operation on the second fuel, comparing, in dependence of the process and operating parameters concerned, the momentorily emitted first control signal values with the first control signal values recorded by the recording means, in order so to adjust second control signal values emitted by the second control unit that the momentarily emitted first control signal values are kept within a predetermined range with respect to the recorded first control signal values.

The invention is based on the concept of also making the conversion of the metering by means of the second electronic control unit adaptive and specifically of doing so in such a way that, during operation on the second fuel, deviations in the control strategy of the first control unit which fall outside a predetermined range are detected and brought back within said range by adjusting the metering of the second fuel.

In the system according to the invention this is achieved in that the control strategy developed by the adaptive control characteristics of the first control unit during operation on the first fuel is stored in suitable recording means of the second control unit. By now, during operation on the second fuel, under the same process and operating parameter values, comparing the control signals momentarily emitted by the first or original control unit with the control signals stored in accordance with the control strategy developed during operation on the first or original fuel, any deviation herein as a consequence of the adaptive behaviour of the first control unit during use of the second fuel can be corrected immediately by suitable adjustment of the metering of the second fuel. In this way a situation in which the first control unit develops a control strategy during operation on the second fuel which differs from that developed for operation on the original first fuel can be effectively prevented. The control strategy of the first control unit can consequently be held at the correct operating point for metering of the first fuel, so that on switching to the first or original fuel a default program will not be started and no losses of performance or additional environmental pollution worthy of note will occur and damage to system components is prevented.

The system according to the invention is therefore particularly suitable for use in combustion installations which have to be operated on other types of fuel as an alternative for some period, for example in the internal combustion engine described above for the purposes of illustration. Although in this example it is assumed that the first or original fuel is petrol and the alternative or second fuel is LPG, it will be clear that the reverse can also be the case and that several types of second fuel can be used.

The range within which a correction is made to the metering of the second fuel can, instead of being very narrow as indicated above, also be set so wide that some degree of adjustment in the control strategy is possible during operation on the second fuel. An average of the operating ranges of the first and second fuels can be considered in this context. Although a disruption to the optimum control strategy for, for example, petrol then occurs, it is nevertheless possible effectively to prevent the control strategy falling completely outside the operating range. This type of control is, for example, advantageous if one or the other fuel is used for a prolonged period, because with this procedure a certain degree of optimisation in metering control can be achieved for both fuels.

A further important advantage of the system according to the invention is that it can be used irrespective of the type of control unit, that is to say the control algorithm incorporated herein. After all, a control strategy which has been developed is adopted dynamically by the second electronic control unit by means of recording of the relevant control signals.

In a further embodiment of the system according to the invention, the second control unit comprises authorisation means for authorising the recording of first control signal values during operation on the first fuel depending on the detection of predetermined values of respective process an operating parameters.

In yet a further embodiment of the system according to the invention, the authorisation means are arranged for authorising comparison, during operation on the second fuel, of the first control signal values momentarily emitted with the first control signal values recorded by the recording means, depending on the detection of the relevant predetermined values of respective process and operating parameters.

The purpose of this further embodiment is to prevent undesired adjustments to the metering in response to control signal values during the initiation or start-up stage of a combustion process.

In order to prevent undesired adjustment of the metering during relatively severe and rapid changes in operating conditions, in yet a further embodiment of the system according to the invention, the authorisation means are arranged to authorise the recording and/or comparison of the first control signal values during operation on the first and/or second fuel depending on a quasi-steady state of operation for the combustion installation determined from the respective process and operating parameters.

In one embodiment of s system according to the invention, efficient storage of control signal values is achieved in that the second control unit comprises further comparison means, which are coupled to the recording means, for recording, during operation on the first fuel, only first control signal values which differ from the first control signal values already stored.

The system according to the invention can be used either in combustion installations in which the various types of fuel are supplied via the same metering means and the second control unit then has to be provided with switching means which can be actuated to interrupt the control of the fuel supply means by the first control unit or in a system in which the various types of fuel are supplied to the combustion installation via individual fuel supply means, as is customary, for example, in internal combustion engines.

The system according to the invention is suitable for use of various types of fuel supply means, in particular time-controlled fuel injectors. In addition to the-detection of the process and operating parameter values of a combustion installation which are regarded as important for fuel metering, which process and operating parameters of course differ depending on the type of combustion installation, it is also preferable to be able to base the metering of the second fuel by the second control unit on the characteristics of the second fuel which determine the combustion. Data relating to the composition of the fuel and, for example, the pressure under which the latter is supplied can be considered in this context.

Although the system according to the invention is particularly suitable for rendering an existing combustion installation operating on an original or first fuel suitable for use with an alternative and second type of fuel, or for rendering combustion installations which have already been modified in this way suitable for application of the method according to the invention, the first and second control units can, according to yet a further embodiment, be produced as a single integral unit. This is of interest in particular for newly manufactured combustion installations or for existing combustion installations which are provided with a new control system.

The invention relates in particular to use in an internal combustion engine, the means for detecting process and operating parameter values at least comprising temperature, load and revolution count detectors as well as means for analysing the combustion emissions. Detectors suitable for this purpose are known per se in practice and nowadays form part of the normal known equipment for four-stroke Otto engines provided with petrol injection systems.

The present invention also relates to a method for the metered supply of at least a first and a second type of fuel, in particular petrol and LPG (Liquid Petroleum Gas), to a combustion installation, such as an internal combustion engine, comprising a first electronic control unit for metering, via fuel supply means, the supply of the first and second fuel, and detection means for the detection of process and operating parameter values of the combustion installation, and a second electronic control unit, coupled to the first control unit and the fuel supply means, for metering the supply of the second fuel under the control of the first control unit, characterized by the following steps of:

recording, by the second control unit, during operation on the first fuel, in dependence of respective detected process and operating parameter values, first control signal values emitted by the first control unit, said first control unit having adaptive control characteristics, comparing, by the second control unit, during operation on the second fuel, in dependence of the respective detected process and operating parameter values, the momentarily emitted first control signal values with the recorded first control signal values, and, in case of a difference between the momentarily emitted and the recorded first control signal values outside a predetermined range, adjusting the second control signal values emitted by the second control unit so as to keep the difference within the range concerned.

In yet a further embodiment the invention also provides a system wherein the second electronic control unit comprises a digital processor unit provided with several inputs for supplying control signal values originating from an electronic control unit for metering the first fuel and detected process and operating parameter values from the combustion installation, and several outputs, for transmitting to the fuel supply means control signal values for metering the fuel supply, and recording means, coupled to the processor unit, for recording supplied control signal values in dependence of respective operating and process parameters, the processor unit being arranged to compare, in dependence of the process and operating parameters concerned, the control signal values momentarily supplied to the processor unit with the control signal values recorded by the recording means, in order so to adjust the control signal values emitted by the processor unit that the control signal values momentarily supplied are kept within a predetermined range with respect to the recorded control signal values.

In a preferred embodiment the processor unit is arranged to authorise the recording and/or comparison of the supplied control signal values depending on predetermined values of respective process and operating parameters and/or a quasi-steady state of operation of the combustion installation determined from the respective process and operating parameters. Suitable recording means comprise a so-called EEPROM (Electrically Erasable/Programmable Read Only Memory).

The inventive concept is explained in more detail below with reference to an application in an internal combustion engine, which application is illustrated by a drawing.

DETAILED DESCRIPTION

Figure 1:
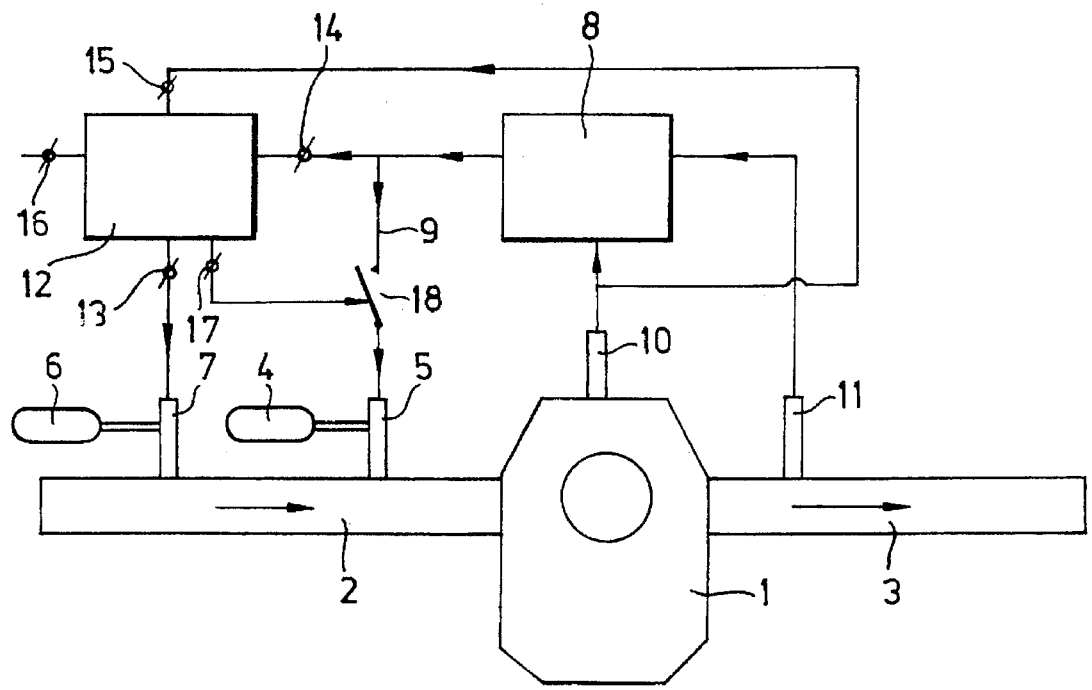
FIG. 1 shows, diagrammatically, the system according to the invention used in an internal combustion engine.

In FIG. 1 a combustion installation in the form of an internal combustion engine, for example a four-stroke four-cylinder Otto engine, is shown in its entirety by reference numeral 1 and is provided with a combustion mixture inlet pipe 2 and an exhaust gas pipe 3.

The internal combustion engine 1 has first or original fuel supply means 4, for example for the supply of petrol, and first fuel injectors 5, which are connected to said fuel supply means and by means of which the first fuel can be made up, together with air drawn in, in the inlet pipe 2 into a combustion mixture for the internal combustion engine 1.

In addition to the first fuel supply means 4, second fuel supply means 6, for example for the supply of LPG (Liquid Petroleum Gas), with associated second fuel injectors 7, are provided, by means of which, as an alternative to the first fuel, a second type of fuel can be mixed with air in the inlet pipe 2 to form a combustion mixture for the internal combustion engine 1.

A first or original electronic control unit 8 is provided for determination of the metering of the first fuel, which first control unit transmits first control signals to the fuel injectors 5 via a signal line 9. In the case of time-controlled fuel injectors 5, which are known per se, said first control signals comprise electrical pulses of a specific duration and repeat frequency, depending on detected process and operating parameter values for the internal combustion engine 1. For this purpose, detection means 10, in the form of temperature, load and revolution count detectors, are provided, as well as means 11 with which the composition of the exhaust gas can be analysed, for example a so-called lambda probe, which means are accommodated in the exhaust gas pipe 3. The data obtained from the detection means 10 and the feedback signal emitted by the means 11 are supplied to the first control unit 8, which, on the basis of these data, optionally in conjunction with data relating to the composition of the first fuel, develops a control strategy for optimum control of the combustion process in the internal combustion engine 1 within a particular operating range.

For metering the second fuel, a second electronic control unit 12 is connected via an input connection point 14 to the first control unit 8. Second control signals are transmitted to the second fuel injectors 7 by the second control unit 12 via one or more output connection points 13. One or more input connection points 15, which, as is shown in FIG. 1, are connected to the detection means 10, are provided for supplying process and operating parameter values to the second control unit 12, and an input connection point 16 is provided for supplying a fuel selection signal to the second control unit 12.

Furthermore, switching means 18 are accommodated in the signal line 9 from the first control unit 8 to the first fuel injectors 5, which switching means can be actuated from an output connection point 17 by the second control unit 12. Mechanical switching means 18 are shown here merely by way of example so that the invention can be understood. Of course, semiconductor switching means can also be used for this purpose.

For the sake of simplicity valves, fuel pumps, pressure regulators, ignition means and the like needed to operate the internal combustion engine 1 are not included in the diagram in FIG. 1. However, for a person skilled in the an these are obvious components of an internal combustion engine, which require no further explanation. The first or original electronic control unit 8 is likewise a standard component in present day internal combustion engines operating with fuel injection. In order to understand the invention it is only important to know that said control units have adaptive characteristics, that is to say that the metering strategy is adapted automatically to a changed demand for fuel as a consequence of changes which arise in the internal combustion engine 1 as a result of wear, play and the like and, if desired, also the combustion characteristics of the fuel supplied.

Figure 2:
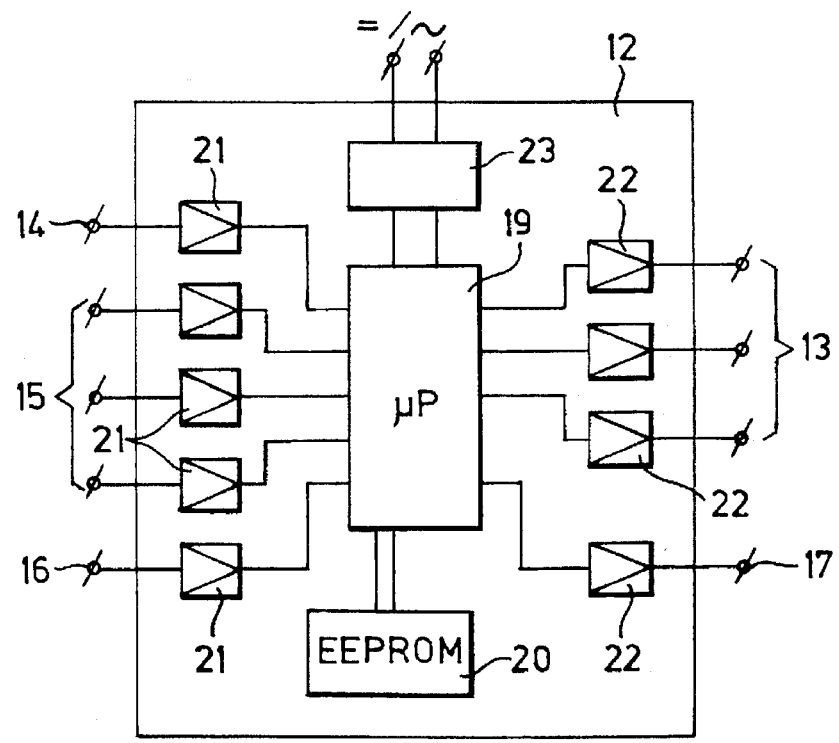
FIG. 2 shows a block diagram of an electronic control unit for use in the system according to the invention.

FIG. 2 shows a block diagram of an embodiment of the second electronic control unit 12 according to the invention.

In the embodiment shown, the second control unit 12 contains a processor unit 19, which comprises a microprocessor and associated control components, an electrical power unit 23 for producing the necessary operating voltage (s) and recording or memory means 20 in the form of an EEPROM (Electrically Erasable/Programmable Read Only Memory).

The processor unit 19 is provided with a number of input connection points 15 for supplying process and operating parameter values, an input connection point 14 for supplying the control signals from the first control unit 8 and an input connection point 16 for supplying a fuel selection signal. The processor unit 19 also has a number of output connection points 13 for transmitting control signals to the fuel supply means, such as the second fuel injectors 7, and an output connection point 17 for controlling switching means 18. Depending on the embodiment and application of the electronic control unit 12, it can be necessary to incorporate amplifiers and/or analogue/digital or digital/analogue converters, which are designated in general by the reference numerals 21, 22, in the connection from the diverse input and output connection points, respectively, to the processor unit 19. The means designated by reference numeral 21 render the received signals suitable for processing by the processor unit 19, whilst the means 22 render the signals emitted by the processor unit 19 suitable for supplying to the various fuel injectors and the like.

The memory unit 20 is configured in such a way that, on the basis of parameter values supplied to the input connection points 15, the associated first control signals, emitted by the first control unit 8, can be stored here digitally in table or matrix form. The processor unit 19 is, furthermore, so programmed that said unit is able to compare supplied first control signal values with stored first signal values, if desired on condition that predetermined parameter values apply, and suitably adjust the received first control signal values to produce second control signal values transmitted to the output connection points 13 for metering the supply of second fuel. The various features are organised such that, during operation on the second fuel, the first control signals momentarily received are kept within a predetermined range of the first control signal values stored in the memory means 20.

The functioning of the system according to the invention can now be appreciated as follows.

Starting from operation on the original or first type of fuel, for example petrol, the control unit 8 will, as a consequence of its adaptive mode of operation, develop a control strategy with which the internal combustion engine 1 will be operated in the optimum manner within its operating range. To this end, a first closed control circuit in the form of the first control unit 8, the first fuel injectors 5, the internal combustion engine 1 and the lambda probe 11 can be identified.

During operation on the first fuel, the second control unit 12 operates to store the transmitted first control signal values in the recording or memory means 20 in dependence of the detected process and operating parameter values. In this context it is possible, for example, to use air mass and speed of revolutions as two operating parameter values along the axes of a two-dimensional table in the recording means 20 of the second control unit 12. During operation on the first fuel it is then possible to store the first control signals emitted by the first control unit 8 in the two-dimensional table, for example in a (quasi)-steady operating state (for which, depending on the application, a possible criterion could be: no changes greater than 10% in process and operating parameter values over a period of 10 seconds), which state is determined by authorisation means. Specific control signal values can already be stored beforehand in the memory means. After a first initialisation stage, it is preferable to program the processor unit 19 in such a way that the only values still recorded are those with differ from the control signals already stored. In this way the memory means 20 always contain the most up-to-date control strategy of the first control unit 8.

On switching to operation on the second type of fuel, by actuating the input connection point 16, the second control unit 12 activates the switching means 18 and, via the output connection points 13, transmits suitable second control signal values to the second fuel injectors 7, for example second control signal values which are suitable for the metering of LPG. All of this is under the control of the first control unit 8, which, via the detection means 10 and the lambda probe 11, determines the frequency and duration of the second control signal values emitted on the basis of the detected process and operating parameter values. In this case as well a closed control circuit can again be identified, namely the first control unit 8, the second control unit 12, the second fuel injectors 7, the internal combustion engine 1 and the lambda probe 11.

The processor unit 19 is now operating in such a way that first control signals momentarily from the first control unit 8 are compared with the first control signal values stored under the same operating conditions in the memory means 20. By way of example, the second control unit 12 can check, in a state of operation determined by authorisation means (such as, for example, the abovementioned (quasi) steady state of operation), whether the first control signal values momentarily produced by the first control unit 8 correspond to the values recorded in the two-dimensional table under the said conditions (speed of revolutions and air mass). This check is carried out in order, in the event of a discrepancy failing outside a predetermined range, to adjust the metering of the second fuel, via the second control signals emitted, such that the first control signal values at the particular instant again agree with the corresponding stored first control signal values, at least to within the predetermined range.

The result of this adaptive behaviour of the second control unit 12 is to prevent the control strategy of the first control unit 8 being so disturbed by the use of the second fuel that it is brought outside the operating range for the first fuel.

On switching from the second fuel to the first fuel by suitable actuation of the input connection 16, the control signals to the second fuel injectors 7 are switched off and the switching means 18 are switched over again so that the control signals from the first control unit 8 are again transmitted to the first fuel injectors 5.

Because, as a consequence of the method according to the invention, the control strategy of the first control unit 8 has not been brought outside the operating range for running the internal combustion engine 1 on the first fuel, there will be virtually no or a negligible loss of performance and fuel and virtually no or negligible additional environmental pollution as a result of an incorrect combustion process, which would be the case if the first control unit 8 were "disrupted" at the time of the switch-over.

It is advisable to carry out the recording, comparison and adjustment of the conversion only when the internal combustion engine 1 is warm and the operating parameters load, speed of revolutions and the like are stable and preferably when the operating conditions are quasi-steady state. To this end, the processor unit 19 can be provided with a suitable authorisation procedure.

It will be clear to a person skilled in the art that, from the standpoint of switching technology, the functions of comparison of control signal values and authorisation of said comparison and adjustment of the control signal values transmitted by the second control unit 12, which have been described above, can also be realised using individual components instead of in a programmed manner using a processor.

Although the invention has been illustrated with reference to an application in an internal combustion engine, it is, of course, not restricted to this application and can also be employed for use in, for example, a gas-powered turbine, combustion furnaces and the like. Depending on the application, the first fuel can be LPG and the second fuel petrol. A single set of fuel injectors, which then have to be controlled in a suitable manner, can, for example, also suffice.

We claim:

1. System for the metered supply of at least a first and a second type of fuel, in particular petrol and LPG (Liquid Petroleum Gas), to a combustion installation, such as an internal combustion engine (1), comprising a first electronic control unit (8) for metering, via fuel supply means (4, 6), the supply of the first and second fuel, and detection means (10) for the detection of process and operating parameter values of the combustion installation, and a second electronic control unit (12), coupled to the first control unit (8) and the fuel supply means (4, 6), for metering the supply of the second fuel under the control of the first control unit (8), characterized in that said first electronic control unit (8) has adaptive control characteristics and said second electronic control unit (12) is provided with recording means (20) for, during operation on the first fuel, recording, in dependence of respective detected process and operating parameter values, first control signal values emitted by the first control unit (8) and with control and comparison means (19) for, during operation on the second fuel, comparing, in dependence o the process and operating parameters concerned, the momentarily emitted first control signal values with the first control signal values recorded by the recording means (20), in order so to adjust second control signal values emitted by the second control unit (12) that the momentarily emitted first control signal values are kept within a predetermined range with respect to the recorded first control signal values.

2. System according to claim 1, wherein the second control unit comprises authorisation means for authorising the recording of first control signal values during operation on the first fuel in dependence of the detection of predetermined values of respective process and operating parameters.

3. System according to claim 2, wherein the authorisation means are arranged for authorising the comparison, during operation on the second fuel, of the momentarily emitted first control signal values with the first control signal values recorded by the recording means, in dependence of the detection of the relevant predetermined values of respective process and operating parameters.

4. System according to claim 2, wherein the authorisation means are arranged to authorise the recording and/or comparison of the first control signal values during operation on the first and/or second fuel in dependence of a quasi-steady state of operation of the combustion installation determined from the respective process and operating parameters.

5. System according to claim 1, wherein the second control unit comprises further comparison means, which are coupled to the recording means, for recording, during operation on the first fuel, only first control signal values which differ from the first control signal values already stored.

6. System according to claim 1, provided with switching means which can be activated by the second control unit to interrupt the control of the fuel supply means by the first control unit.

7. System according claim 1, wherein the fuel supply means comprise individual first and second fuel supply means for individually controlling the metering of the first and the second fuel respectively by the first and the second control unit.

8. System according to claim 7, wherein the fuel supply means comprise time-controlled fuel injectors.

9. System according claim 1, wherein the first and second control means form a single integral control unit.

10. System according claim 1, wherein the detection means further comprise means for detecting the combustion-determining characteristics of the first and/or second fuel.

11. System according claim 1, wherein the second electronic control unit comprises a digital processor unit provided with several inputs for supplying control signal values originating from an electronic control unit for metering the first fuel and detected process and operating parameter values from the combustion installation, and several outputs for transmitting to the fuel supply means control signal values for metering the fuel supply, and recording means, coupled to the processor unit, for recording supplied control signal values in dependence of respective operating and process parameters, the processor unit being arranged to compare, in dependence of the process and operating parameters concerned, the control signal values momentarily supplied to the processor unit with the control signal values recorded by the recording means, in order so to adjust the control signal values emitted by the processor unit that the control signal values momentarily supplied are kept within a pre-determined range with respect to the recorded control signal values.

12. System according to claim 11, wherein the processor unit is arranged to authorise the recording and/or comparison of the supplied control signal values in dependence of predetermined values of respective process and operating parameters and/or a quasi-steady state of operation of the combustion installation determined from the respective process and operating parameters.

13. System according to claim 11, wherein the recording means comprise a so-called EEPROM (Electrically Erasable/Programmable Read Only Memory).

14. System according claim 1, in which the second electronic control unit is interposed between the first control unit and the fuel supply means.

15. System according to claim 14, wherein the means for detecting process and operating parameter values at least comprise temperature, load and revolution count detectors as well as means for analysing the combustion emissions.

16. Method for the metered supply of at least a first and a second type of fuel, in particular petrol and LPG (Liquid Petroleum Gas), to a combustion installation, such as an internal combustion engine (1), comprising a first electronic control unit (8) for motoring, via fuel supply means (4, 6), the supply of the first and second fuel, and detection means (10) for the detection of process and operating parameter values of the combustion installation, and a second electronic control unit (12), coupled to the first control unit (8) and the fuel supply means (4, 6), for metering the supply of the second fuel under the control of the first control unit (8), characterized by the steps of:

recording, by the second control unit (12), during operation on the first fuel, in dependence of respective detected process and operating parameter values, first control signal values emitted by the first control unit (8), said first control unit having adaptive control characteristics, comparing, by the second control unit (12), during operation on the second fuel, in dependence of the respective detected process and operating parameter values, the momentarily emitted first control signal values with the recorded first control signal values, and, in case of a difference between the momentarily emitted and the recorded first control signal values outside a predetermined range, adjusting the second control signal values emitted by the second control unit (12) so as to keep the difference within the range concerned.

17. Method according to claim 16, further comprising the step of authorisating the recording of the first control signal values in dependence of the detection of predetermined values of respective process and operating parameters.

18. Method according to claim 16, further comprising the step of authorisating of the comparison of the momentary and recorded first control signal values in dependence of the detection of predetermined values of respective process and operating parameters.

19. Method according to claim 17, further comprising the step of determining a quasi-steady state of operation of the combustion installation from the respective process and operating parameters for authorisating the recording and/or comparison of the first control signal values.

* * * * *